W. J. DUVALL.
ANTISKID ATTACHMENT.
APPLICATION FILED JULY 6, 1917.

1,341,789.

Patented June 1, 1920.

William J. Duvall
Inventor

By Geo. P. Kimmel
Attorney

UNITED STATES PATENT OFFICE.

WILLIAM J. DUVALL, OF WASHINGTON, DISTRICT OF COLUMBIA.

ANTISKID ATTACHMENT.

1,341,789.  Specification of Letters Patent.  Patented June 1, 1920.

Application filed July 6, 1917. Serial No. 178,946.

*To all whom it may concern:*

Be it known that I, WILLIAM J. DUVALL, a citizen of the United States, and resident of Washington, in the District of Columbia, have invented certain new and useful Improvements in Antiskid Attachments, of which the following is a specification.

This invention relates to improvements in anti-skid devices; the dominant object of the invention being to provide an anti-skid device which can be detachably arranged over the tread portion of a tire or wheel and when in position thereon, will prevent the skidding of the same longitudinally or transversely of slippery or muddy surfaces.

Another and equally important object of the invention is to provide an anti-skid device which is exceedingly simple in construction and which can be made in a single operation by stamping or similar machinery.

Other objects will be in part obvious and in part pointed out hereinafter.

The improvements in the details and arrangement of parts will be apparent from an inspection of the accompanying drawings, in connection with the specific description hereinafter contained, and wherein the preferred embodiments of the invention are disclosed for the purpose of imparting a full understanding of the same.

In the drawings:—

Having more particular reference to the drawings wherein like reference characters designate corresponding parts throughout the several views, and referring first to the Fig. 1, W represents the felly of a vehicle wheel having arranged upon its peripheral surface a cushion tire T.

Figure 1:
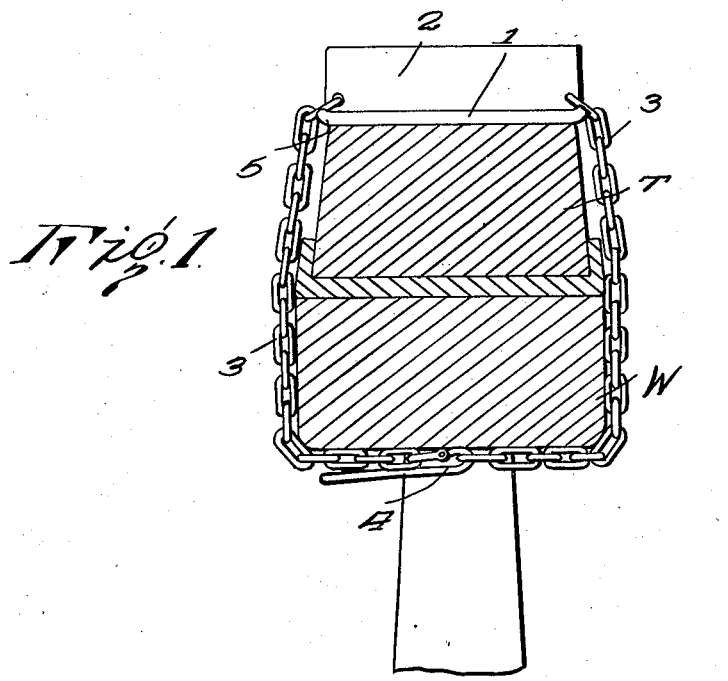
Figure 1 is a transverse section through the cushion tire of a wheel with the improved anti-skid device applied thereto.

The anti-skid device comprises a plate preferably formed of sheet metal and designated by the numeral 1, which plate has formed transversely thereof an upstanding rib or web portion 2, the tread portion being struck or stamped upwardly during the making of the device. Thus, it will be appreciated that the web portion will serve as sufficient means for positively engaging slippery or muddy surfaces and preventing skidding of the wheel. Openings are formed in the opposite ends of the web portion 2 and receive therethrough certain of the links of chains 3, one of these chains carrying a cam tightener 4 upon its free end, which cam tightener is adapted to be engaged with the adjacent link of the opposite chain 3 in order that the same may be drawn tightly about the wheel felly W and the anti-skid device securely arranged over the tread portion of the tire T. Further, it will be also noted that the opposite ends of the plate 1 are bent slightly laterally as at 5, thus finishing the device.

Figure 2:
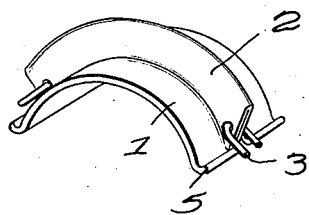
Fig. 2 is a perspective view of a slightly modified form of anti-skid device for use on pneumatic or other tires having convex tread portions.

In the Fig. 2 I have shown a slightly modified form of anti-skid plate, the same being constructed identical with that shown in the Fig. 1 with the exception that the device is curved in order that it may be arranged about the convex tread portion of pneumatic or other similar tires.

Figure 3:
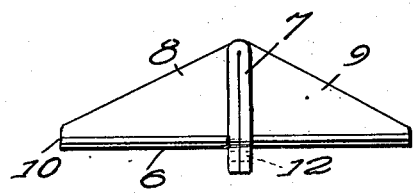
Fig. 3 is an end elevation of another slightly modified form of anti-skid device.
Figure 4:
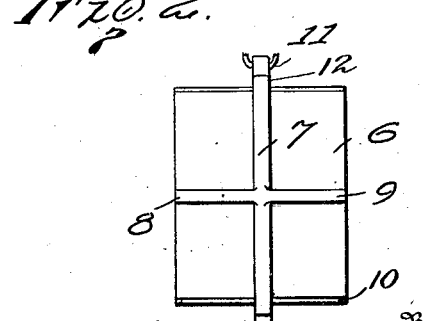
Fig. 4 is a plan view of the same.

Another slightly modified form of antiskid device is illustrated in Figs. 3 and 4 and comprises a base plate 6 from which a right angularly disposed longitudinally extending web portion 7 is stamped or struck, while inclined web portions 8 and 9 are arranged transversely of the said plate, substantially intermediate its ends. These web portions 8 and 9 can be secured to the base plate 6, or the same can be struck therefrom, in a manner similar to the forming of the web portion 7. The opposite ends of the base plate 6 are also bent outwardly as at 10 similar to the constructions shown in the Figs. 1 and 2. In this connection, it will be appreciated that the turning of these ends not only finishes the appearance of the plate, but also affords means for preventing the cutting or abrading of the tire about which the device is arranged.

Chains 11 have certain of the links thereof passed through ears 12 formed on the web portion 7 and have their opposite ends securely connected by means of a camming catch, such as shown in Fig. 1 and designated by the reference character 4.

It will be readily understood, that any number of the improved anti-skid devices may be arranged about the tread portions of tires or wheels, such as conditions or preference may dictate; further, that the same may be adjusted to various points thereon to prevent a skidding of the wheel.

Manifestly, the construction shown is capable of considerable modification and such modification as is within the scope of my claim, I consider within the spirit of my invention.

I claim:—

An anti-skidding attachment comprising a base plate struck outwardly and compressed to cause adjacent portions thereof to lie against each other to form a longitudinal web inclined downwardly from its center portion to the base plate to prevent skidding of a vehicle, the portions of said base plate on each side of the central portion of the longitudinal web struck outwardly and compressed to form a transverse web at right angles to said longitudinal web for reinforcing said longitudinal web and to engage a road bed to propel a vehicle forward and means engaging said last named web for holding the base plate on a vehicle wheel.

In testimony whereof, I affix my signature hereto.

WILLIAM J. DUVALL.